Patented Sept. 28, 1926.

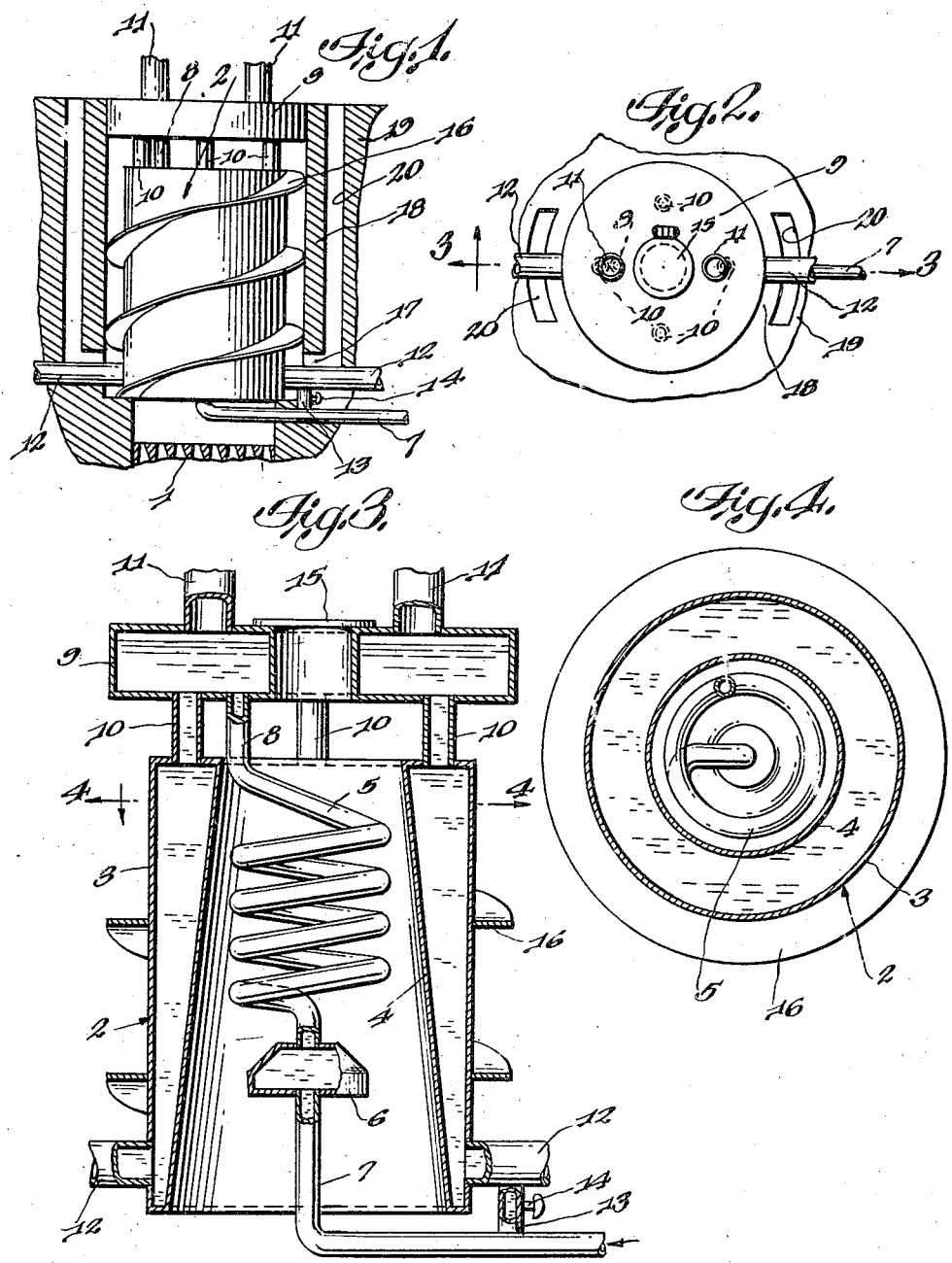

1,601,192

UNITED STATES PATENT OFFICE.

CHARLES WEIDLER, OF CHICAGO, ILLINOIS.

DOWNDRAFT HOT-WATER HEATER.

Application filed October 2, 1925. Serial No. 60,061.

This invention relates to improvements in down draft hot water heaters, and has for one of its principal objects the provision of a heating means for water which shall be particularly efficient in utilizing practically all of the heat developed, and which, moreover, shall contain in a minimum space a maximum water capacity.

One of the important objects of this invention is to provide, in a heater for water or the like, means for positively directing the blast of heating gases from the flame of the furnace first upwardly and then downwardly, and finally to a discharge flue so as to result in a maximum utilization of heat units developed.

Still another and further important object of this invention is to provide, in a down draft furnace, means for regulating and directing the flow of heated air both upwardly and downwardly, whereby a very efficient combination of the oxygen of the air with carbon and the like is produced.

Other and further important objects of the invention will be apparent from the disclosures in the accompanying drawings and following specification.

The invention, in a preferred form, is illustrated in the drawings and hereinafter more fully described.

In the drawings:

Figure 1 is a vertical elevation, partly in section, illustrating the construction of the improved down draft furnace of this invention.

Figure 2 is a top plan view of the furnace, parts being omitted.

Figure 3 is a vertical sectional view illustrating the interior construction of the furnace and the water container.

Figure 4 is a sectional view, taken on the line 4—4 of Figure 3.

As shown in the drawings:

The reference numeral 1 indicates generally the grate bars of a furnace or the like, which grate bars may be substituted by a gas burner or similar element, if desired.

Positioned above the grate bars is a water tank or the like 2, preferably cylindrical and comprising an outer shell 3 and an inner shell 4, which is in the shape of a frustrum of a cone, as illustrated in Figure 3, and which is open to provide for free passage of heated air and burning gases therethrough.

Positioned in the inner chamber 4 is a coil, pipe or the like 5, adapted for the passage of cold water therethrough to be heated, and adjacent the coil 5 is a container 6 also adapted for the reception of water to be heated.

A pipe 7 leads into the container 6 of the coil 5, this pipe being the inlet pipe for cold water and ordinarily containing water under pressure.

At the top of the coil 5 a pipe 8 leads outwardly and upwardly to a hot water receiving tank 9, which in turn is connected with the tank 2 by means of pipes 10, which allow the water to flow into the space between the walls 3 and 4. Outlets 11 are provided for the heated water in the top of the tank 9.

Additional pipes 12 are provided at the bottom of the tank and one of these pipes is connected by a short connection 13 to the intake pipe 7, the connection 13 having a suitable regulating valve or other stop cock 14 therein.

A cover 15 is provided for the circular opening in the center of the upper tank 9, this cover being adapted for the insertion of fuel into the burner and to the grate bars in the event that the same burns coal or other similar material.

Surrounding the tank 2 is a spiral flange 16, as best shown in Figure 1, whereby heated air rising through the inner portion of the tank 2 will be deflected by the upper tank 9 and the cover member 15 down past the helical flange 16 into openings 17 positioned in the inner walls 18 of the furnace. A suitable outer wall 19 is also provided to allow for a flue 20 to be provided for the discharge of burned gases.

It will be seen that herein is provided a down draft burner or heater, particularly for water, wherein the heat units developed by combustion of fuel will be practically all utilized and in a very desirable manner so as to allow for a large supply and reserve of heated water at all times. Further, a furnace or heater is provided which requires but little attention, and one which will not be liable to become damaged or get out of order.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. The combination with a furnace including wall portions defining exhaust flues and openings at the lower end portion of the flues opening communication between the flues and the interior of the furnace, of a tank confined in the furnace and including an inner shell tapering upwardly and inwardly, a supply conduit in communication with the tank, a receiving tank providing the top wall of the furnace and disposed in spaced relation with respect to the first mentioned tank, conduits supporting the receiving tank above the first mentioned tank and opening communication between the first mentioned tank and the receiving tank, a coiled conduit in communication with the receiving tank and confined within the inner shell, a container disposed at the lower-end of the coiled conduit, and in communication therewith, a supply conduit in communication therewith, a supply conduit in communication with the container, and a member confined between the outer shell of the first mentioned tank and the interior walls of the furnace providing a spiral passage leading from the space between the receiving tank and the first mentioned tank to the openings of the exhaust flues.

2. A down draft burner including a tank comprising an inner and outer shell, the walls of the inner shell of the tank being tapered upwardly and inwardly, a supply conduit in communication with the tank, a receiving tank disposed above and in spaced relation with the first mentioned tank, conduits supporting the receiving tank above the first mentioned tank and opening communication between the first mentioned tank and the receiving tank, a coiled conduit confined within the walls of the inner shell, and in communication with the receiving tank, a conduit in communication with the supply conduit and the coiled conduit, and a member extending spirally around the outer shell.

In witness whereof, I hereunto subscribe my name this 28th day of September A. D. 1925.

CHARLES WEIDLER.